Figure 1:
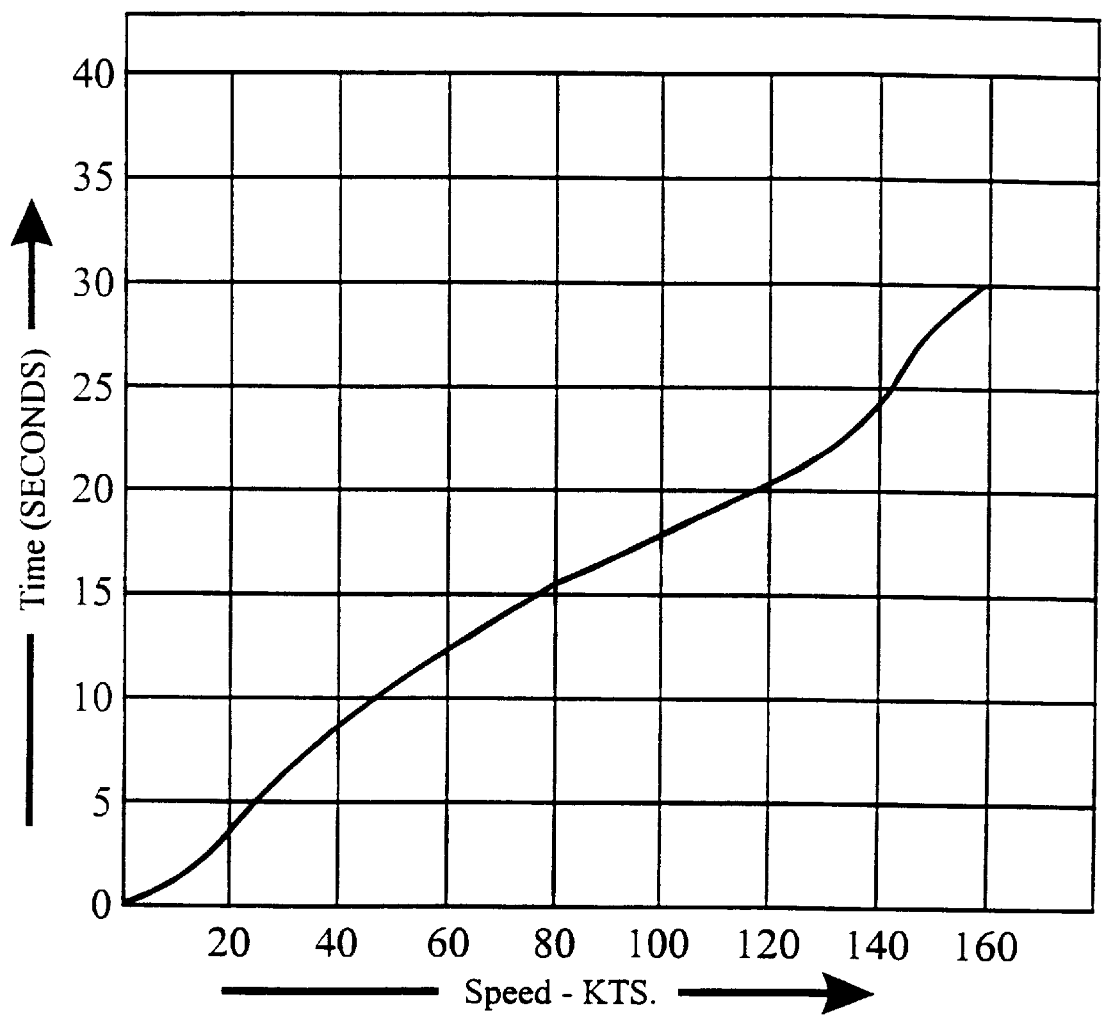
Figure 2:
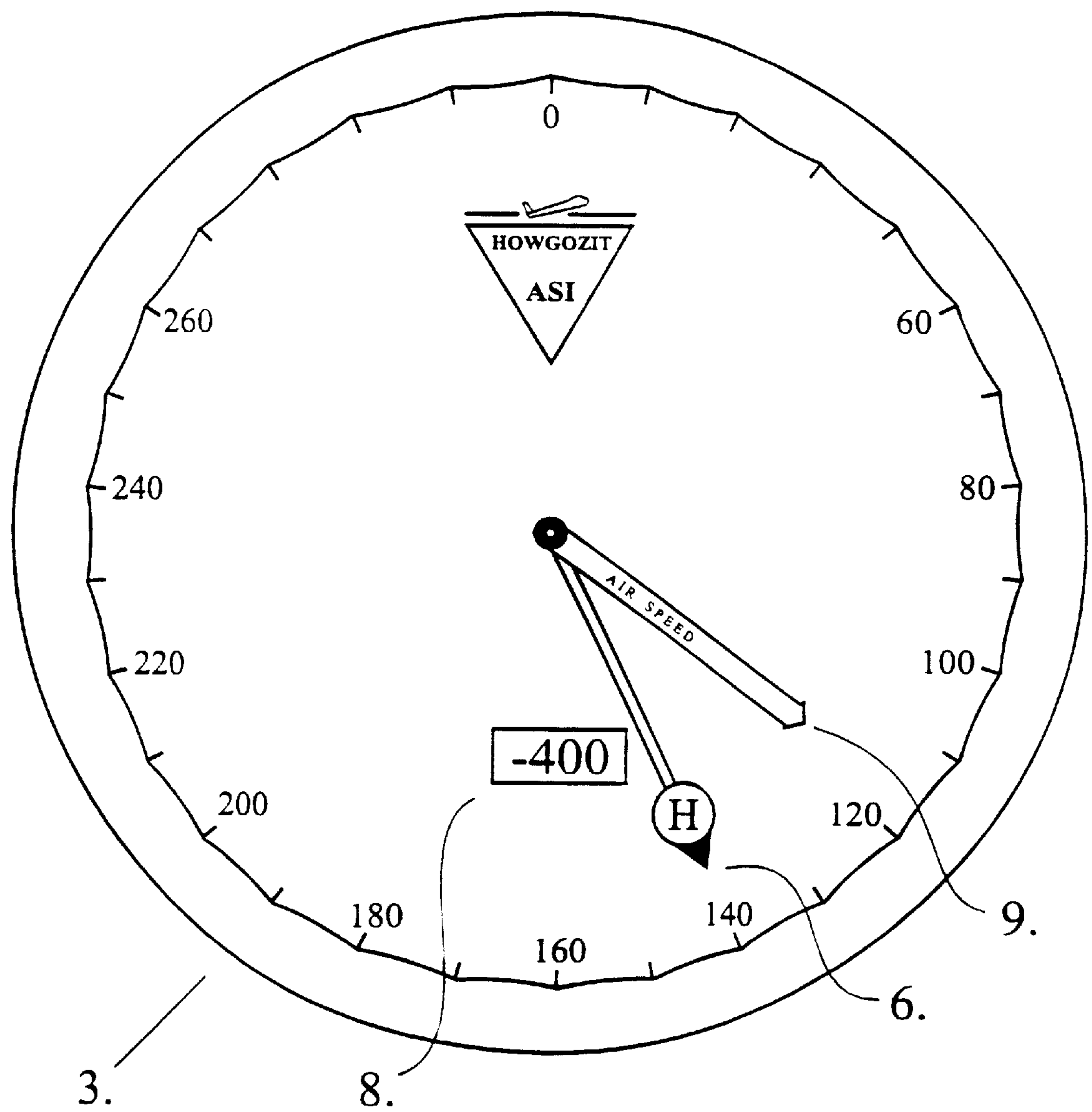
Figure 3:
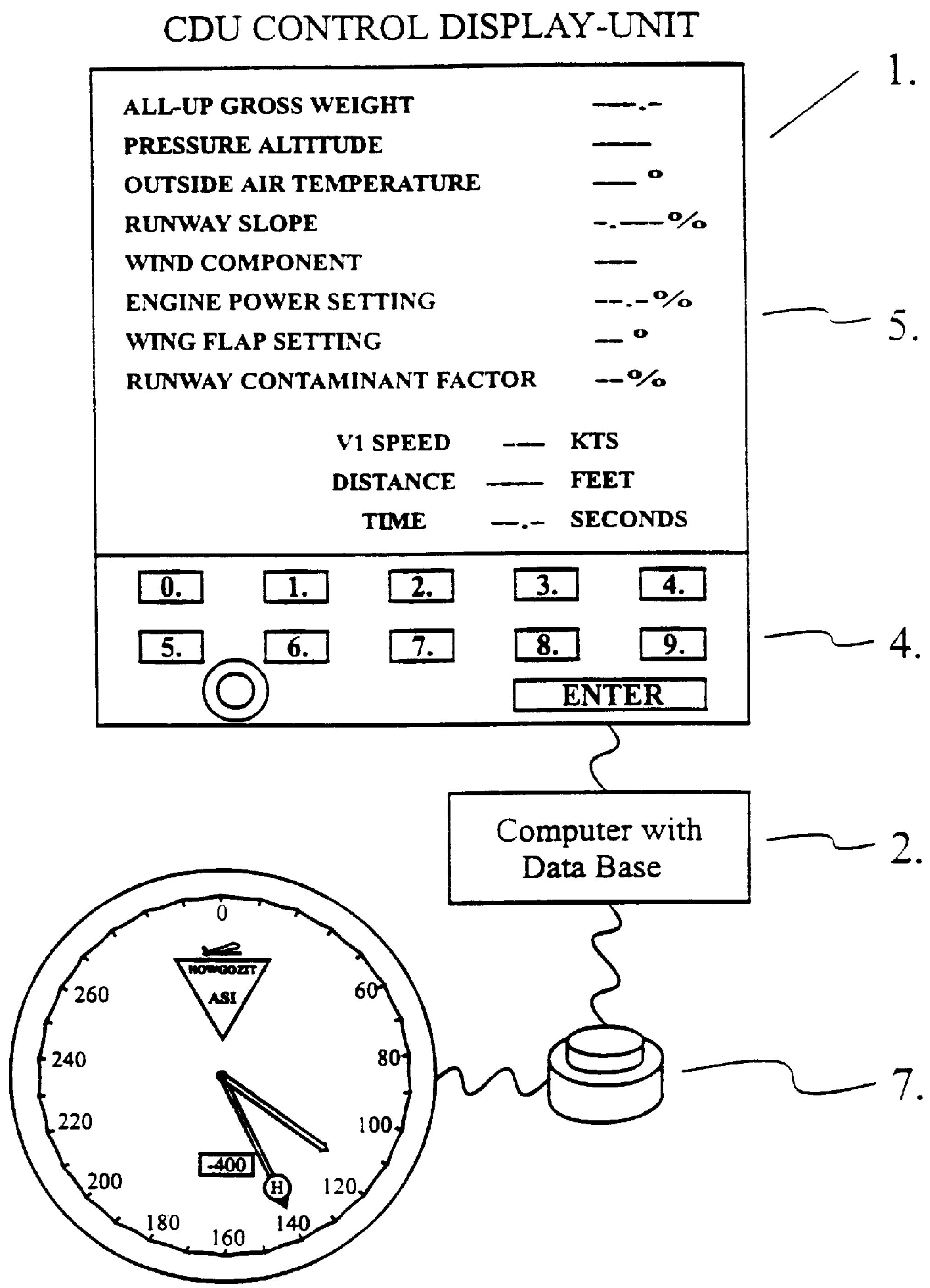

US006133857A

United States Patent [19]
Millard et al.

[11] Patent Number: 6,133,857

[45] Date of Patent: Oct. 17, 2000

[54] AIRCRAFT TAKEOFF VELOCITY INDICATOR SYSTEM

[76] Inventors: Wayne C. Millard; Carl W Millard, both of Hangar #5 Bay #1 2450 Derry Rd. East, Mississauga, Ont., Canada, L5S 1B2

[21] Appl. No.: 09/461,356

[22] Filed: Dec. 15, 1999

Related U.S. Application Data

[63] Continuation of application No. 08/839,511, Apr. 14, 1997, abandoned.

[51] Int. Cl.[7] .......... G08B 21/00

[52] U.S. Cl. .......... 340/959; 340/945; 340/969; 701/15; 73/178 T

[58] Field of Search .......... 340/959, 945, 340/969; 701/15, 3; 73/178 T

[56] References Cited

U.S. PATENT DOCUMENTS

| | | | |
|---|---|---|---|
| 2,922,982 | 1/1960 | Hoekstra | 340/959 |
| 3,025,494 | 3/1962 | Andresen, Jr. | 340/959 |
| 3,128,445 | 4/1964 | Hosford | 340/959 |
| 3,182,498 | 5/1965 | Koletsky et al. | 340/959 |
| 3,863,204 | 1/1975 | Hoekstra | 340/959 |
| 4,130,015 | 12/1978 | Grover | 73/178 T |
| 4,638,437 | 1/1987 | Cleary et al. | 340/959 |
| 4,843,554 | 6/1989 | Middleton et al. | 364/427 |
| 4,980,833 | 12/1990 | Milligan et al. | 73/178 T |
| 5,103,224 | 4/1992 | Arad | 340/959 |
| 5,124,700 | 6/1992 | Bonafe | 340/959 |
| 5,353,022 | 10/1994 | Middleton et al. | 340/959 |
| 5,499,025 | 3/1996 | Middleton et al. | 340/959 |

FOREIGN PATENT DOCUMENTS

| | | |
|---|---|---|
| 1520676 | 8/1978 | United Kingdom . |

OTHER PUBLICATIONS

J.H.H. Grover: "Towards safer take–offs" Flight International, p. 601–602, vol. 86, No. 2899, XP002054350, Oct. 1964.

*Primary Examiner*—Jeffery A. Hofsass
*Assistant Examiner*—Sihong Huang
*Attorney, Agent, or Firm*—Eugene J. A. Gierczak

[57] ABSTRACT

An aircraft instrument system that informs the pilot of whether, during the takeoff roll, the aircraft's acceleration rate is sufficient to ensure that V1 speed will be achieved at the expected time (and thus distance), and, if not, how far in distance the aircraft is lagging behind the required acceleration schedule.

8 Claims, 3 Drawing Sheets

SCHEMATIC OF HOWGOZIT AIRSPEED INDICATOR SYSTEM

CDU CONTROL DISPLAY-UNIT

ALL-UP GROSS WEIGHT —.–
PRESSURE ALTITUDE —
OUTSIDE AIR TEMPERATURE — °
RUNWAY SLOPE –.—%
WIND COMPONENT —
ENGINE POWER SETTING —.–%
WING FLAP SETTING — °
RUNWAY CONTAMINANT FACTOR —%

V1 SPEED — KTS
DISTANCE — FEET
TIME —.– SECONDS 0. 1. 2. 3. 4.
5. 6. 7. 8. 9.
ENTER

Computer with Data Base

HOWGOZIT ASI
0 60 80 100 120 140 160 180 200 220 240 260
400

1. 5. 4. 2. 7.

"HOWGOZIT" AIRSPEED INDICATOR
(ROTARY DIAL-TYPE INSTRUMENT)

SCHEMATIC OF HOWGOZIT AIRSPEED INDICATOR SYSTEM

AIRCRAFT TAKEOFF VELOCITY INDICATOR SYSTEM

This application is a continuation of Ser. No. 08/839,511 filed Apr. 14, 1997 now abandoned.

BACKGROUND

This invention relates to monitoring an aircraft's acceleration during the takeoff roll up to V1 speed.

Aircraft are certified by a State's aeronautical licensing authority; such as, the United States Federal Aviation Agency, Transport Canada, the British Air Registration Board, or the European joint Aviation Authority.

One of the certification requirements involves the aircraft having adequate takeoff performance, such that, with all engines operating, within the available runway distance, the aircraft is capable or accelerating from a standstill to the takeoff decision speed (commonly referred to as the V1 speed or the Go-NoGo speed, where, in event of an engine failure, the aircraft is capable of either continuing the takeoff safely, or, rejecting the takeoff and stopping within the remaining runway distance available.

The takeoff acceleration is dependent upon eight primary criteria, namely, a) All-Up Gross Weight of the Aircraft, b) Altitude of the Airfield, c) Outside Air Temperature, d) Runway Slope, e) Wind Component, f) Engine Power Setting, g) Wing Flap Setting, and h) Runway Contaminants; such as, snow, slush, and standing water.

Aircraft manufacturers produce takeoff performance graphs which, when entered with the appropriate criteria, will show the V1 speed and the runway distance required. During takeoff, the aircraft must maintain an acceleration rate such that V1 will be achieved at, or within, the graphed distance.

Let us consider the position of the pilot who has taxied out from the departure gate and has lined up on the takeoff runway. He knows his V1 speed, and his runway distance required. He commences the takeoff roll. He experiences acceleration that seems satisfactory, but there is no instrumentation system provided to him that directly tells him if the rate of acceleration is in fact satisfactory—that remains, to this day, a "seat of the pants" acquired skill.

Many factors can insidiously retard the required takeoff acceleration rate which may result in having inadequate distance for takeoff, or inadequate distance for the accelerate-stop situation.

Some of the factors that may insidiously retard the required takeoff acceleration rate are: runway contaminants more severe than expected, erroneous engine pressure ratio gauges, engines not delivering rated power, wrong wingflap setting, soft tire(s), dragging brake(s), parking brakes not having been released, etc.

SUMMARY

The object of the invention is to inform the pilot, during the takoff roll, as to whether the aircraft's acceleration rate is on a schedule that will achieve V1 at the required certificated distance.

In the case of a rotary dial-type airspeed indicator, during the takeoff roll, the pilot is informed of the airspeed the aircraft should be at when acceleration is on schedule, by an additional needle in the airspeed indicator, which is herein referred to as the Takeoff Velocity needle.

As the aircraft accelerates during the takeoff roll, the airspeed needle will advance, and the Takeoff Velocity needle will also advance. When both needles are registering equally i.e. one superimposed on the other, then the aircraft's acceleration rate is on schedule. Should the airspeed needle advance ahead of the Takeoff Velocity needle, then the aircraft's acceleration rate is better than planned. Should the airspeed needle lag behind the Takeoff Velocity needle, then the aircraft's acceleration rate is lagging behind the required schedule.

For distance information, a window in the face of the airspeed indicator will digitally display to the pilot how far in distance the aircraft is presently behind the takeoff roll schedule.

DRAWINGS

Sheet 1 of 3 is a Speed versus Time takeoff acceleration graph of an assumed aircraft under assumed conditions, demonstrating the non-uniformity of takeoff acceleration.

Sheet 2 of 3 portrays the race of a dial-type akeoff Velocity Indicator, (showing an aircraft indicating 118 kts. with a required airspeed of 140 kts, and 400 feet behind acceleration schedule).

Sheet 3 of 3 portrays a schematic of the system component interaction.

DESCRIPTION

The basic components of the Takeoff Velocity Indicator System are a CDU (1) Control-Display Unit, a Computer with Database (2), and a Takeoff Velocity Indicator (3) (11).

The CDU Keyboard (4) allows the pilot to load the Computer (2 with the takeoff data pertaining to the planned takeoff, as guided by the first eight prompts in the CDU Display Window (5). The last three lines in the CDU Display Window (5) will then show computed V1 speed, runway distance required and time required, to accelerate to V1. In other words, one enters the aircraft all-up gross weight, airfield altitude, outside air temperature, runway slope, wind component, engine power setting, wing flap setting and a contingency for runway contaminants such as snow, slush, or standing water.

The Database of the Commuter (2) stores the speed-vs-time values of acceleration graph curves for the specific type and model of aircraft, under the variables that affect takeoff acceleration, i.e. as shown in the first eight prompts of the CDU Display window (5).

The Aircraft Takeoff Velocity Indicator (3) (11) displays the actual speed plus the speed at which the aircraft should be at.

Rotary Dial-Type Airspeed Indicator

In the case of the rotary dial-type airspeed indicator, the Aircraft Takeoff Velocity Indicator (3) has two needles and a window (8). One needle is the convenient Airspeed needle (9), and the other is the Takeoff Velocity needle (6) which, during the takeoff roll, will point to the speed the aircraft should be at when its acceleration is on a schedule to achieve V1 speed at the anticipated distance.

If both the Airspeed needle (9) and the Takeoff Velocity needle (6) advance equally, then the aircraft is on acceleration schedule. If the Airspeed needle (9) advances ahead of the Takeoff Velocity needle (6), then the aircraft would be accelerating better than anticipated.

However, if the Airspeed needle (9) lags behind the Takeoff Velocity needle (6), then the aircraft is lagging behind required acceleration, and the Window (9) will display by how much distance. At V1 the Takeoff Velocity needle's (6) usefulness as such ceases, and it automatically returns to the zero, or the start, position.

A Start Button (7), to be operated at the start of the takeoff roll, starts the Takeoff Velocity needle (6) operation. The Computer (2), loaded with its eight prompts for takeoff performance, then governs the rate at which the Takeoff Velocity needle (6) progresses, based on time.

What is claimed is:

1. An instrumentation system for use in aircraft, during takeoff roll from standstill to V1 speed, that shows the pilot continuously the airspeed at which the aircraft should be if it is meeting the acceleration required to be at V1 at the anticipated distance as presented in the manufacturers' approved curves of takeoff acceleration graphs, and wherein a related computer database stores information on said curves of takeoff acceleration graphs of the type and model of said aircraft, with relation to speed versus time on said takeoff roll, and thus distance of the same, and an airspeed indicator continuously displaying the actual speed of said aircraft; and wherein during said takeoff roll up to V1 speed, the said computer continuously governs the progressive movement of a needle in said airspeed indicator that points to the speed at which the aircraft should be if it is meeting said computer-stored acceleration curves based on time.

2. An instrumentation system as claimed in claim 1, further including an instrument panel having a first needle to continuously indicate said actual speed of said aircraft, and a second needle to indicate the speed at which said aircraft should be if it is meeting said computer-stored acceleration curves based on time.

3. An instrumentation system as claimed in claim 2, further including a window in said instrument panel for displaying the computed distance that said aircraft is currently lagging behind when said actual speed is less than said speed at which said aircraft should be if it is meeting said computer-stored acceleration curves.

4. An instrumentation system for use in an aircraft, during acceleration of the aircraft from 0 velocity to V1, for continuously monitoring actual velocity of the aircraft versus target velocity of the aircraft required to accelerate to V1 within an anticipated distance from a standstill position comprising:

(a) input means for entering parameters affecting an anticipated distance from the standstill position required to accelerate to V1;

(b) computing means for calculating from said parameters:

(i) a V1 value for said aircraft;

(ii) anticipated distance from said standstill position required to accelerate to V1;

(iii) time required to accelerate to V1; and (iv) target velocity continuously required to accelerate to V1 within said time required;

(c) means for operably storing said V1 value of said aircraft, anticipated distance from standstill position, time required to accelerate to V1, and target velocity continuously required to accelerate to V1 within said time required to accelerate to V1; and (d) means for displaying the actual velocity of the aircraft;

(e) means for continuously displaying the target velocity required to accelerate to V1 based on said time.

5. An instrumentation system as described in claim 4 which further includes means for displaying continuously the distance said aircraft is lagging behind said aircraft's current position and an anticipated position determined by the anticipated distance from the standstill position required to accelerate to V1.

6. An instrumentation panel for use in an aircraft, during acceleration of the aircraft from 0 velocity to V1, for continuously monitoring actual velocity of the aircraft versus target velocity of the aircraft required to accelerate to V1 within an anticipated distance from a standstill position comprising:

(a) input means for entering parameters affecting an anticipated distance from the standstill position required to accelerate to V1;

(b) computing means for calculating from said parameters:

(i) a V1 value for said aircraft;

(ii) anticipated distance from said standstill position required to accelerate to V1;

(iii) time required to accelerate to V1; and (iv) target velocity continuously required to accelerate to V1 within said time required;

(c) means for operably storing said V1 value of said aircraft, anticipated distance from standstill position, time required to accelerate to V1, and target velocity continuously required to accelerate to V1 within said time required to accelerate to V1; and (d) means for continuously and simultaneously displaying and monitoring the actual speed of the aircraft and the target velocity required to achieve V1 within said time required to achieve V1.

7. An instrumentation system as described in claim 6 which further includes means for displaying continuously the actual distance said aircraft is lagging said aircraft's actual position behind an anticipated position determined by the anticipated distance from the standstill position to accelerate to V1.

8. An instrumentation system as claimed in claim 7 wherein said target velocity uniformly increases from 0 to V1 within said time required to accelerate to V1.

* * * * *